United States Patent Office 2,852,499
Patented Sept. 16, 1958

2,852,499

PROCESS FOR MAKING TERPOLYMERS OF VINYL CHLORIDE, VINYL ACETATE, AND VINYL ALCOHOL

Donald B. Benedict, Chappaqua, N. Y., and Howard M. Rife and Richard A. Walther, Charleston, W. Va., assignors to Union Carbide Corporation, a corporation of New York No Drawing. Application April 8, 1957
Serial No. 651,163

8 Claims. (Cl. 260—87.1)

This invention relates to the production in novel and economical manner of modified copolymers of vinyl chloride and vinyl acetate wherein, by selective partial hydrolysis, portions but not all of the vinyl acetate groups on the copolymer chain are replaced by hydroxyl groups, yielding terpolymers of vinyl chloride, vinyl acetate and vinyl alcohol which contain substantially all of the chlorine originally present in the resin and are not substantially degraded.

Terpolymers of vinyl chloride, vinyl acetate and vinyl alcohol are well known and are now in wide industrial use, since they retain important properties of the copolymers of vinyl chloride and vinyl acetate, such as their strength, flexibility and chemical resistance, while being much more compatible with modifying ingredients such as natural and synthetic resins, oils, high-boiling organic solvents and plasticizers.

Prior to this invention the production of such terpolymers of vinyl chloride, vinyl acetate and vinyl alcohol, containing, by weight, 70% to 93% vinyl chloride, 2% to 20% of vinyl alcohol and 5% to 20% vinyl acetate necessarily has involved the steps of (1) polymerizing a mixture of vinyl chloride and vinyl acetate in an acetone solution to produce a copolymer containing 70% to 90% of vinyl chloride; (2) separation and recovery of the resin from the resultant varnish as a completely dry, substantially acetone-free solid; (3) re-dissolution of the resin in a mixture of methanol and methyl acetate; (4) alcoholysis of the resin in this mixture in the presence of a catalyst, preferably an alkaline catalyst; and (5) isolation and recovery of the resultant terpolymer of vinyl chloride, vinyl alcohol and vinyl acetate, as well as the mixture of solvents.

The aforesaid process has the two disadvantages that (1) the double recovery of dry resins from solvents makes it expensive and complicated, and that (2) there are definite limitations as to the maximum polyvinyl alcohol content of the final terpolymer resin, due to difficulties in precipitating and recovering vinyl chloride-vinyl acetate copolymer resins having vinyl acetate contents higher than around 15%.

The present invention is based in important part upon our discovery that, by the use of certain solvents and solvent mixtures hereinafter described, it is possible to conduct both the polymerization of vinyl chloride and vinyl acetate and the subsequent hydrolysis or alcoholysis in the presence of the same solvent, thus facilitating the efficient production in a commercially practicable manner of valuable terpolymers of vinyl chloride, vinyl acetate and vinyl alcohol, while eliminating (1) the prior steps of the recovery of the resin and the solvent from the polymerization step, and (2) the step of redissolving the resin in a mixture of solvents preparatory to the alcoholysis step, and while removing the prior limitation upon the polyvinyl alcohol content of the final terpolymer resin.

In accordance with one form of the present invention terpolymers of vinyl chloride, vinyl acetate and vinyl alcohol containing between 40% and 93% of vinyl chloride and between 2% and 20% of vinyl alcohol are produced by a process which comprises polymerizing vinyl chloride and vinyl acetate in suitable proportions, at temperatures within the range from 20° to 80° C., thereby forming vinyl chloride-vinyl acetate copolymers having from about 40% to about 93% of vinyl chloride and about 7% to about 60% of vinyl acetate in the polymer. The polymerization is conducted in the presence of a lower alkoxyethanol such as methoxyethanol, or a mixture thereof with another solvent hereinafter described, which is a solvent for the monomers and for the vinyl chloride-vinyl acetate copolymer resin produced. Such solvent is present in amount sufficient to maintain the resultant resin in solution. When the total solids content of the solution reaches a desired point, e. g. 20%, any unreacted monomers are removed. Additional amounts of the aforesaid solvent are added as required to maintain the residual solution in readily flowable form.

The polymerization is conducted in the presence of a catalytic amount of a suitable polymerization catalyst, such as the well known acyl peroxides, and the like. For best results the amount of polymerization catalyst, e. g. diacetyl peroxide, in the vinyl chloride-vinyl acetate resin solution should not greatly exceed 0.30% by weight.

It is an important feature of the invention that the polymerization reaction essentially is conducted in certain solvents consisting of or containing a lower alkoxy-alkanol which are inert to the monomeric reactants and are good solvents for both the vinyl chloride-vinyl acetate copolymers first formed and for the terpolymer resins produced upon the subsequent alcoholysis of the resin in the varnish or solution formed in the initial polymerization.

Any unreacted monomers are stripped from the resultant copolymer resin solution in the selected solvent by vacuum distillation under conditions preventing substantial loss of the selected solvent. The thus-stripped solution of vinyl chloride-vinyl acetate copolymer resin in the solvent then is heated with between 0.10% and 0.30% of its total weight of a suitable alkaline alcoholysis catalyst, such as an alkali metal methylate or an alkali metal 2 - methoxyethylate, preferably at temperatures within the range between 20° and 60° C., until the desired amount of alcoholysis of the vinyl acetate component has been attained. The resultant dilute solution or varnish of the terpolymer resin then can be bleached, if desired, by bubbling chlorine gas through the solution at room temperatures. The bleached varnish is then precipitated, preferably by spray precipitation, using a 65 to 80% solution of the said lower alkoxyethanol-containing solvent in water as the precipitant. The precipitated terpolymer resin then is washed, centrifuged with further washing, and flash dried.

It will be seen that every step of the process, from that of the initial polymerization of the vinyl chloride and vinyl acetate to the final washing and drying of the finished terpolymer resin, is conducted in the presence of a single, inert water-soluble solvent or solvent mixture for the reactants and for the copolymer and terpolymer resins successively formed.

The novel class of solvents and solvent mixtures that are useful in this process include methoxyethanol, mixtures of ethoxyethanol and methoxyethyl acetate containing up to around 50% by volume of the former, and mixtures of ethoxyethanol and dioxane containing up to around 50% by volume of the latter.

When reacting vinyl chloride and vinyl acetate in the first stage of the process in ratios yielding vinyl chloride-vinyl acetate copolymers containing 30% to 60% or more by weight of vinyl acetate in the copolymer either ethoxyethanol or methoxyisopropanol can be used as the solvent during both the polymerization and the subsequent alcoholysis of the vinyl chloride-vinyl acetate copolymers.

The following examples serve to illustrate the invention. In the examples all parts are by weight unless otherwise specified.

EXAMPLE 1

A solution or varnish of a vinyl chloride-vinyl acetate copolymer resin was prepared by polymerizing the two monomers in solution in methoxyethanol at 40° C., using charging weight ratios of 56 parts of total monomers to 44 parts of the solvent, and 65.5 parts of vinyl chloride to 34.5 parts of vinyl acetate, and using diacetyl peroxide as catalyst in a concentration of 0.15%, based upon the weight of the total monomers. Additional vinyl chloride was added continuously during the polymerization to maintain a constant vinyl chloride-vinyl acetate ratio. When the resin solution had a total solids content of about 20%, unreacted vinyl chloride was stripped from the solution while adding methoxyethanol to thin the solution to the desired consistency for ease in handling. The residual resin solution was stripped of excess vinyl acetate monomer by vacuum distillation in a continuous stripping column operating at 24 to 130 mm. of mercury pressure. The resin solution entered near the top of the column and moved countercurrently to vapors of methoxyethanol entering the bottom of the column, in the ratio of 1 part of said vapors per 2.4 parts of the solution, all by weight. The monomers were removed overhead.

The resultant stripped solution in methoxyethanol of the copolymer of vinyl chloride and vinyl acetate containing 85% of the vinyl chloride and having a specific viscosity of 0.56 (all specific viscosities were measured at 20° C. using 1 gram of the resin in 100 cc. of methyl isobutyl ketone, and a Ubbelohde viscosimeter), was alcoholized to a terpolymer containing 91% of vinyl chloride and 6% of vinyl alcohol by heating the said solution at 40° C. for 1 hour in admixture with 0.225% of sodium methylate, based upon the weight of the stripped resin solution. The resultant terpolymer varnish then was bleached to the desired degree by bubbling chlorine therethrough at 40° C.

The bleached terpolymer resin varnish was filtered under pressure and diluted with an 80% solution of methoxyethanol in water in a weight ratio of about 30 to 100 of diluent to varnish. The diluted varnish then was precipitated with a 25% solution of methoxyethanol in water, in the weight ratio of 27 parts of the precipitant to 130 parts of the said diluted varnish. The resultant slurry of precipitated terpolymer resin in methoxyethanol containing about 18.5% of water was washed with water and was then centrifuged, and flash dried. The resultant terpolymer resin contained 91% vinyl chloride, 3% of vinyl acetate and 6% vinyl alcohol; and had a specific viscosity at 20° C. of 0.60. The resin was compatible with commercially available alkyd-type and nitrogen-type resins, such as those being marketed under the trade names "Duraplex ND–77–B," "Uformite F–240," "Melmac 880–1," "Glyptal 2570," "Rezyl 412," "Rezyl 387," and "Rezyl 869."

The unreacted vinyl chloride recovered from the autoclave, the unreacted vinyl acetate and methoxyethanol recovered from the stripping column, and the methoxyethanol recovered from the terpolymer washing step and from the centrifuging operation, may be reused in the process.

No polymerization occurred in the stripping column, where temperatures ranged from 54° to 75° C. at the base of the column, and from 36° to 50° C. at the top of the column. However, if desired, a small amount of a polymerization inhibitor, e. g., 40 p. p. m. of hydroquinone, tertiary butyl catechol or the like, can be introduced into the polymer solution entering the stripping column as a safeguard to inhibit further polymerization.

EXAMPLE 2

This example illustrates the effectiveness of the process in the production of terpolymers when starting with mixtures of vinyl chloride and vinyl acetate capable of yielding copolymers containing around 15% or more of vinyl acetate, many of which are difficult to precipitate and handle in prior known processes.

Following the general procedure described in Example 1, a stainless steel autoclave equipped with an agitator was charged with vinyl chloride, vinyl acetate, methoxyethanol and diacetyl peroxide in the weight ratio of 35 parts vinyl chloride to 65 parts vinyl acetate, a weight ratio of 40 parts of total monomers to 60 parts of the said solvent, and using 0.3% of the diacetyl peroxide, based upon the weight of the total monomers. The solvent was first charged. Then the catalyst was mixed with the vinyl acetate and charged. The autoclave was purged with vinyl chloride and heated to 50° C. The vinyl chloride then was added stepwise during the run to keep a constant vinyl chloride-vinyl acetate ratio, although this stepwise addition is not necessary. The run was continued for 29.5 hours. The resultant copolymer contained 69% of vinyl chloride and 31% of vinyl acetate and had a specific viscosity of 0.34 at 20° C.

The resultant autoclave varnish was vacuum stripped to a head temperature of 40° C. until the stripped varnish contained less than 0.5% of vinyl acetate. The resultant varnish, comprising 17% of the copolymer in methoxyethanol, had mixed therewith 0.3% of its weight of sodium methylate catalyst, and was heated at 40° C. for 2 hours, the catalyst being added in increments during the first hour. The resultant product had a light amber color. Chlorine gas was bubbled through the varnish until it became colorless.

The bleached varnish was diluted with a 75% solution of methoxyethanol in water until the varnish became cloudy. Thereafter the resin was precipitated from the thus-diluted varnish by pouring it into a cold aqueous solution of methoxyethanol containing 75% of water. The precipitated resin was washed, centrifuged, and dried. The resultant terpolymer resin contained 78.3% of vinyl chloride, 13.2% of vinyl alcohol and 8.5% of vinyl acetate, and had a specific viscosity at 20° C. of 0.331.

By substituting a mixture of ethoxyethanol and dioxane for the methoxyethanol a higher polymerization rate can be secured under identical polymerization conditions, although in the subsequent alcoholysis the degree of alcoholysis is somewhat lower. The use of mixtures of ethoxyethanol and methoxyethyl acetate gives polymerization rates like those secured with methoxyethanol, and the subsequent alcoholysis gives results the equivalent of those secured with methoxyethanol.

Table A lists data of certain solvent polymerizations conducted at 40° C. for a period of 20 hours, of vinyl chloride and vinyl acetate in the weight ratio of 64 to 36, and in the presence of the solvents indicated, with total monomer to solvent weight ratios of 56 to 44, using as catalyst 0.15% of diacetyl peroxide, based on the total weight of the monomers. These results are shown in Table A.

*Table A*

| Solvent used in the polymerization | Final total solids, weight percent of resin in the solution | Conversion, percent by weight |
|---|---|---|
| Methoxyethanol | 7.5 | 13.4 |
| Mixture of ethoxyethanol and dioxane, 50/50% by volume | 31.0 | 55.0 |
| Mixture of ethoxyethanol and methoxyethyl acetate, 50/50% by volume | 6.0 | 10.7 |

The aforesaid resins were stripped of monomers, and dissolved in the solvents indicated below to form a 12% solution of the resin, and the solutions were heated for one hour at 40° C., in the presence of 0.225% of sodium methylate, based on the weight of the resin solution, yielding the resin products described in Table B:

Table B

[Resin analysis, percent by weight.]

| Solvent | Vinyl chloride | Vinyl acetate | Vinyl alcohol | Specific viscosity at 20°C. |
|---|---|---|---|---|
| Methoxyethanol | 90.4 | 3.0 | 6.6 | 0.650 |
| 50/50% mixture of ethoxyethanol and dioxane, by volume | 87.6 | 8.1 | 4.3 | 0.559 |
| 50/50% mixture of ethoxyethanol and methoxyethyl acetate, by volume | 91.3 | 1.7 | 7.0 | 0.612 |

In the alcoholysis operation amounts of catalysts ranging as low as 0.05% based upon the stripped resin solution are effective where low concentrations of vinyl alcohol groups, i. e. 1 to 3%, are desired in the terpolymer.

The specific viscosities of the various resins recited herein were determined at 20° C., using a solution of 1 gram of the resin in 100 cc. of methyl isobutyl ketone, and a Ubbelohde viscosimeter.

By the practice of this invention, it is now possible to produce, in a commercially practicable manner, valuable resinous terpolymers of vinyl chloride, vinyl acetate and vinyl alcohol containing from around 40% to around 93% of vinyl halide, and from around 2% to around 20% of vinyl alcohol in the polymer, from monomeric vinyl chloride and vinyl acetate, without the need for the isolation, recovery, drying and dissolution of the vinyl chloride-vinyl acetate copolymer first formed.

The invention is susceptible of modification within the scope of the appended claims.

What is claimed is:

1. Process for producing terpolymers of vinyl chloride, vinyl acetate and vinyl alcohol, which comprises reacting vinyl chloride and vinyl acetate in proportions yielding a vinyl chloride-vinyl acetate copolymer resin containing between 30% and 60% of vinyl acetate, in solution in a solvent of the class consisting of methoxyethanol, ethoxyethanol, methoxyisopropanol, mixtures of ethoxyethanol and dioxane, and mixtures of ethoxyethanol and methoxyethyl acetate, in the presence of a polymerization catalyst, stripping unreacted monomers from the resultant resin solution, heating the stripped solution of such resin with a small amount of an alkaline alcoholysis catalyst at temperatures within the range from around 20° to 60° C., and precipitating and recovering from the resultant resin solution a terpolymer of vinyl chloride, vinyl acetate and vinyl alcohol containing from about 40% to about 70% of vinyl chloride and from 2% to around 20% of the vinyl alcohol.

2. Process for producing terpolymers of vinyl chloride, vinyl acetate and vinyl alcohol containing from about 7% to about 60% of vinyl acetate and from about 2% to about 20% of vinyl alcohol, which comprises reacting vinyl chloride and vinyl acetate in proportions yielding a copolymer of vinyl chloride and vinyl acetate containing from about 7% to about 60% of vinyl acetate, in solution in a solvent of the class consisting of methoxyethanol, mixtures of ethoxyethanol and dioxane, and mixtures of ethoxyethanol and methoxyethyl acetate, in the presence of a polymerization catalyst, stripping unreacted monomers from the resultant resin solution, thereafter heating the stripped solution of such resin with a small amount of an alkaline alcoholysis catalyst at temperatures within the range from around 20° C. to around 60° C., and precipitating and recovering from the resultant resin solution a terpolymer of vinyl chloride, vinyl acetate and vinyl alcohol containing from about 40% to about 93% of vinyl chloride and from about 2% to about 20% of vinyl alcohol.

3. Process as defined in claim 1, wherein the solvent is methoxyethanol.

4. Process as defined in claim 1, wherein the alcoholysis catalyst is an alkali metal methylate.

5. Process as defined in claim 1, wherein the alcoholysis catalyst is an alkali metal 2-methoxyethylate.

6. Process as defined in claim 2, wherein the solvent is 2-methoxyethanol.

7. Process as defined in claim 2, wherein the alcoholysis catalyst is an alkali metal methylate.

8. Process as defined in claim 2, wherein the alcoholysis catalyst is an alkali metal 2-methoxyethylate.

References Cited in the file of this patent

UNITED STATES PATENTS

| | | |
|---|---|---|
| 2,512,726 | Penn et al. | June 27, 1950 |
| 2,536,114 | Weaver et al | Jan. 2, 1951 |